Dec. 31, 1940.  R. W. GATES  2,226,904
EGG CASE FILLER
Filed July 12, 1938
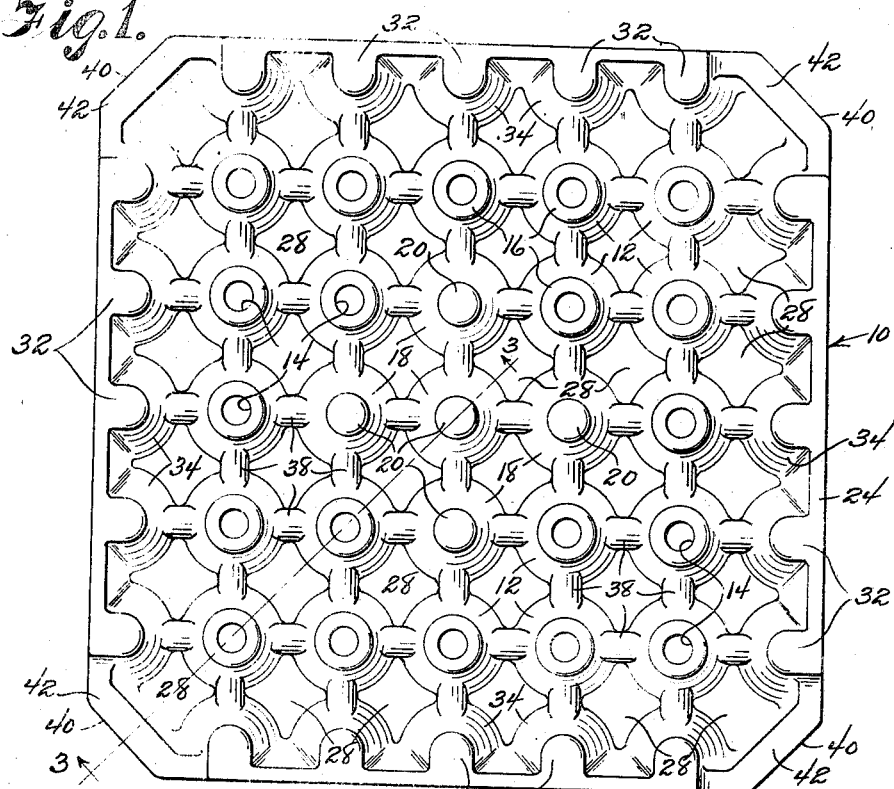
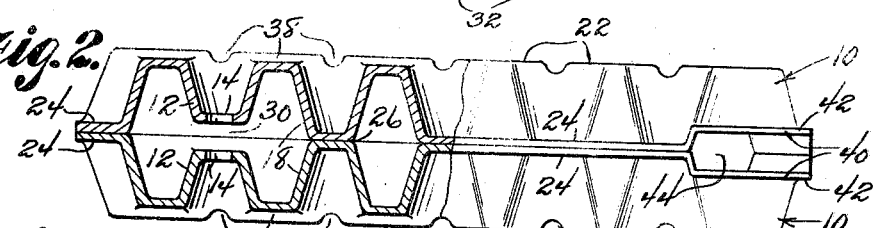
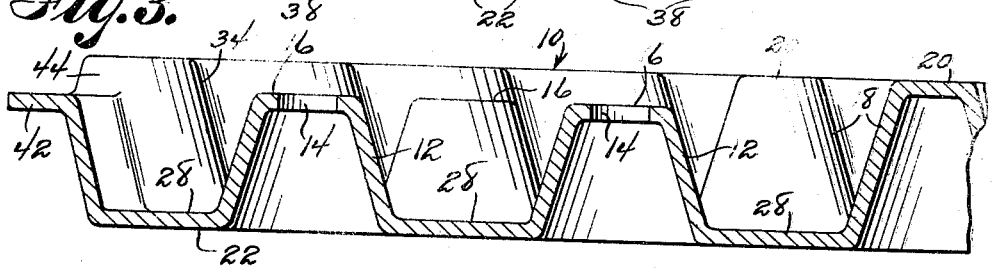
Renfrew W. Gates
INVENTOR
BY Victor J. Evans & Co.
ATTORNEYS Patented Dec. 31, 1940

2,226,904

UNITED STATES PATENT OFFICE 2,226,904

EGG CASE FILLER

Renfrew W. Gates, Gainesville, Fla., assignor to Cushion Filler Company, a corporation of Florida Application July 12, 1938, Serial No. 218,831

2 Claims. (Cl. 217—26.5)

My invention relates to egg cases and includes among its objects and advantages the provision of an improved filler.

An object of my invention is to provide a filler designed to support and protect eggs in which the filler is so constructed as to afford effective circulation of air about the nested eggs.

A further object is to provide a filler shaped to provide cells for supporting and protecting nested eggs in which the filler embodies air circulating means throughout its entire area together with novel means for the inlet of air into the filler.

Another object is to provide a filler embodying two complementary sheets shaped to have face to face relation for defining a plurality of egg cells and in which the sheets are shaped in a novel manner about their perimeter to provide air vents of relatively large capacity. The sheets are so shaped as to provide interconnected air circulating passages throughout the entire area of the sheets, which interconnected air passages have communication with the openings about the perimeter of the sheets.

Another object is to provide a filler unit adapted to be positioned in an egg crate with the filler unit so designed as to facilitate the entrance of air into the filler unit, notwithstanding the fact that the filler unit might fit snugly within the wall structure of the case.

In the accompanying drawing:

Figure 1 is a top plan view of the filler sheet;

Figure 2 is a side elevational view of two filler sheets arranged for nesting eggs with certain parts broken away for the sake of clearness; and Figure 3 is an enlarged sectional view along the line 3—3 of Figure 1.

In the embodiment selected to illustrate my invention, the filler 10 of Figure 1 is preferably molded of papier-mâché and is formed to provide a plurality of hollow truncated cones 12. The truncated cones 12 are arranged in parallel lines vertically and horizontally of the filler 10 when viewed according to Figure 1. These lines are arranged in right-angular relation. Openings 14 are provided in the flat tops 16 of the truncated cones 12. Within the perimeter of the filler 10 I provide a plurality of hollow truncated cones 18 which have their flat tops 20 imperforate. Truncated cones 12 and 18 are interconnected through flat areas 22. The flat faces 16 of the cones 12 terminate in a common plane lower than the plane of the flat faces 20 of the cones 18.

Figure 2 illustrates two filler units 10 as they are related for egg containing purposes. Each filler unit includes four flanges 24 which are arranged in overlapping relation. When so arranged, the flat faces 20 of the units 10 have contacting relation as at 26. Thus the truncated cones 18 cooperate with the flanges 24 for holding the units 10 in egg supporting relation. The truncated cones 12 and 18 are arranged to provide a plurality of compartments 28 for the reception of eggs. The compartments 28 are generally rectangular in configuration and tapered with the bases of the compartments registering to define a configuration capable of supporting eggs. The eggs are arranged with their major axes vertically of the flat areas 22 and the chambers 28 have multipoint contact with the eggs. Such multipoint contact provides effective support for the eggs but the contacting relation between the eggs and the truncated cones 12 and 18 is such as to provide circulation for a relatively large amount of air about the eggs. The flat faces 16 are spaced considerably apart as at 30. Flanges 24 terminate in inwardly extending faces 32 lying in the same line as the flanges so that the faces of one unit 10 will have supporting relation with the faces 32 on the companion unit 10. The faces 32 comprise the tops of the semicircular truncated cones 34 extending along the four flanges 24.

The flat faces 22 between adjoining bases of the truncated cones 12 and 18 are depressed to provide recesses 38. While the flat areas 22 of one filler unit might lie on the flat faces of an adjacent unit, the depressions 38 provide air passages throughout the entire area of the adjacent filler units. The recesses 38 have communication with the hollow truncated cones 12, the openings 14 of which cones, establish communication with the interior of the assembled unit of Figure 2.

In Figure 1, I illustrate the unit 10 as being cut away at 40 at each of its corners. The diagonal margins or flanges 42 are depressed to lie below the adjacent flanges 24 so as to provide openings 44 for the circulation of air. While the perimeter of the filler 10 might fit closely inside the egg case, the diagonal flanges 42 provide air spaces extending longitudinally of the corners of the case, which air spaces have communication with the interior of the assembled units 10 of Figure 2 through the medium of the openings 44. Each filler unit 10 comprises a one piece element which may be formed by molding or stamping from fibrous material such as papier-mâché. The material is of sufficient compactness to lend the necessary strength to the element in addition to embodying properties which negative breaking of the eggs. Flanges 24 in combination with the truncated cones 18 provide an effective support for the two operatively related units 10. At the same time, the flat areas 24 of one unit 10 rest upon the same flat areas of an adjacent unit.

Referring to Figure 3, the tops of the cones 12 terminate short of the flanges 24 as well as the faces 32. Because of the short length of the cones more than one-half the length of the egg will project above the supporting cones, thus rendering the egg more accessible for consummating an effective grasp thereon. This feature facilitates placement as well as removal of the eggs.

Without further elaboration, the foregoing will so fully illustrate my invention, that others may by applying current knowledge readily adapt the same for use under various conditions of service.

I claim:

1. In an egg case: a filler fashioned to provide a plurality of first and second hollow, truncated cones spaced to provide egg chambers therebetween, with each chamber having multipoint contact with an egg positioned therein; said second cones being shorter than the first cones and the latter having their apices terminating in a common plane; said first and second cones having their bases lying in a common plane and projecting in the same direction; said filler having a supporting flange about its perimeter lying in a plane common to the apices of said first cones; the tops of the second cones being provided with openings; said filler, when positioned on another such filler with respect to which it is inverted, has its supporting flange and its first cones resting on the same flange and the first cones respectively of the other filler, with the openings in the second cones of the fillers vertically aligned; the filler having openings in its perimeter so that air may circulate freely into the spaces between the fillers, through the egg cells formed by cooperating chambers and upwardly in vertical columns through the aligned openings in the second cones.

2. In an egg case: a filler fashioned to provide a plurality of first and second hollow, truncated cones spaced to provide egg chambers therebetween, with each chamber having multipoint contact with an egg positioned therein; said second cones being shorter than said first cones, to facilitate placing and removing of eggs; said first and second cones projecting in the same direction; said filler having supporting flange means about its perimeter lying in a plane common to the apices of said first cones; said filler, when positioned on another such filler with respect to which it is inverted, having its supporting flange means and its first cones resting on the same flange and the first cones respectively of the other filler.

RENFREW W. GATES.